Sept. 5, 1939.　　　　F. H. MUELLER　　　　2,171,943
PRESSURE CONTROL FITTING
Original Filed July 31, 1937　　　3 Sheets-Sheet 2
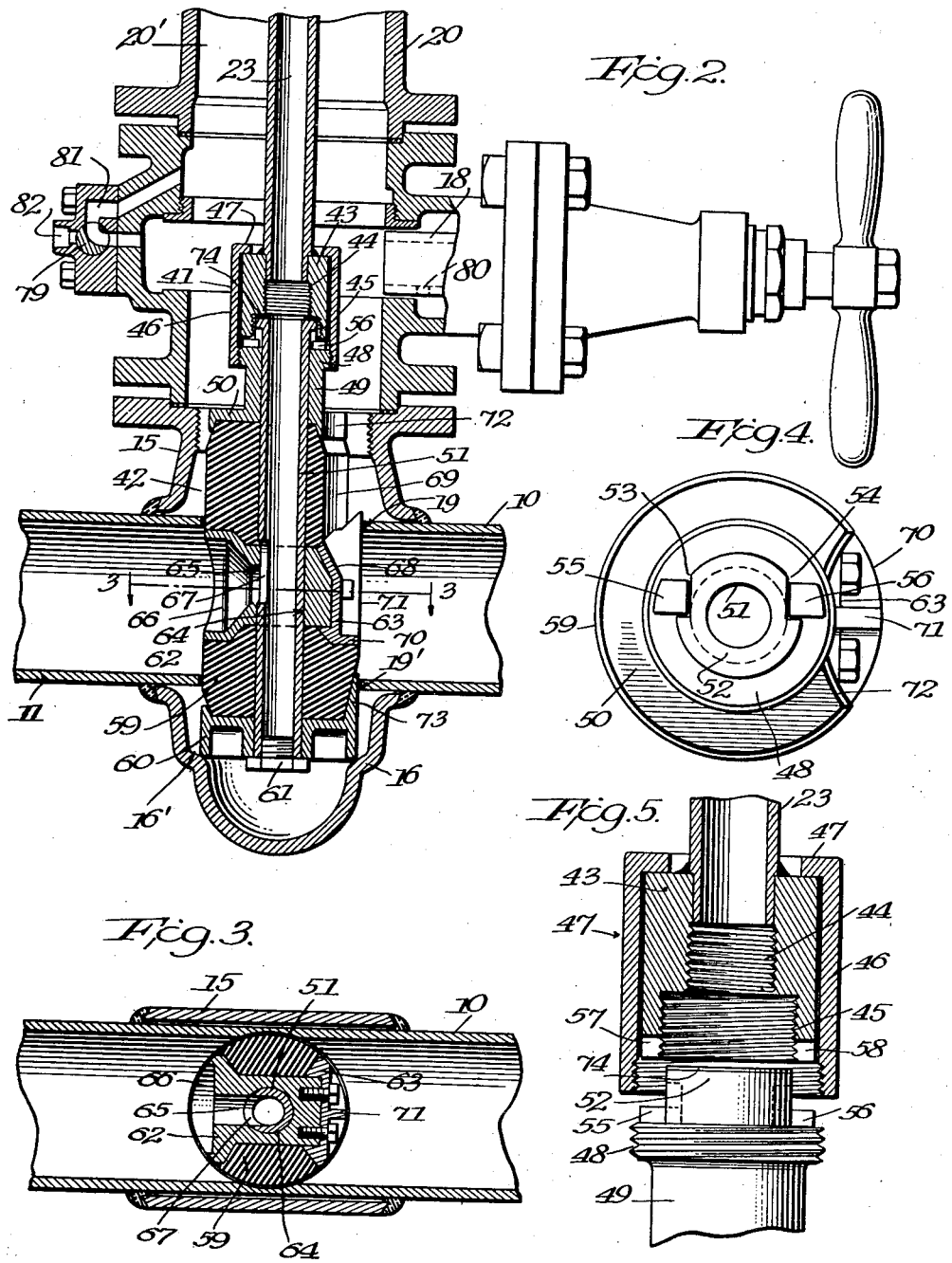
Inventor
Frank H. Mueller
By Cushman, Darby, & Cushman
Attorneys Sept. 5, 1939.  F. H. MUELLER  2,171,943
PRESSURE CONTROL FITTING
Original Filed July 31, 1937   3 Sheets-Sheet 3

Inventor
Frank H. Mueller
Attorneys

Patented Sept. 5, 1939

2,171,943

UNITED STATES PATENT OFFICE 2,171,943

PRESSURE CONTROL FITTING

Frank H. Mueller, Decatur, Ill., assignor to Mueller Co., Decatur, Ill., a corporation of Illinois Original application July 31, 1937, Serial No. 156,795. Divided and this application April 4, 1938, Serial No. 200,000

11 Claims. (Cl. 137—69)

The present invention relates to method and apparatus for the control of fluid in a conduit which is to be repaired or in part replaced without substantial loss of fluid or fluid pressure therefrom, and in the case of a flowing conduit, without interruption of flow. The invention relates more particularly to method and means for evacuating the section to be operated on of the fluid contained therein, for subsequently purging of air the repaired or replaced section and reestablishing line pressure therein, and for carrying out the various maneuvers without substantial dilution of the conduit fluid with air.

Figure 1:
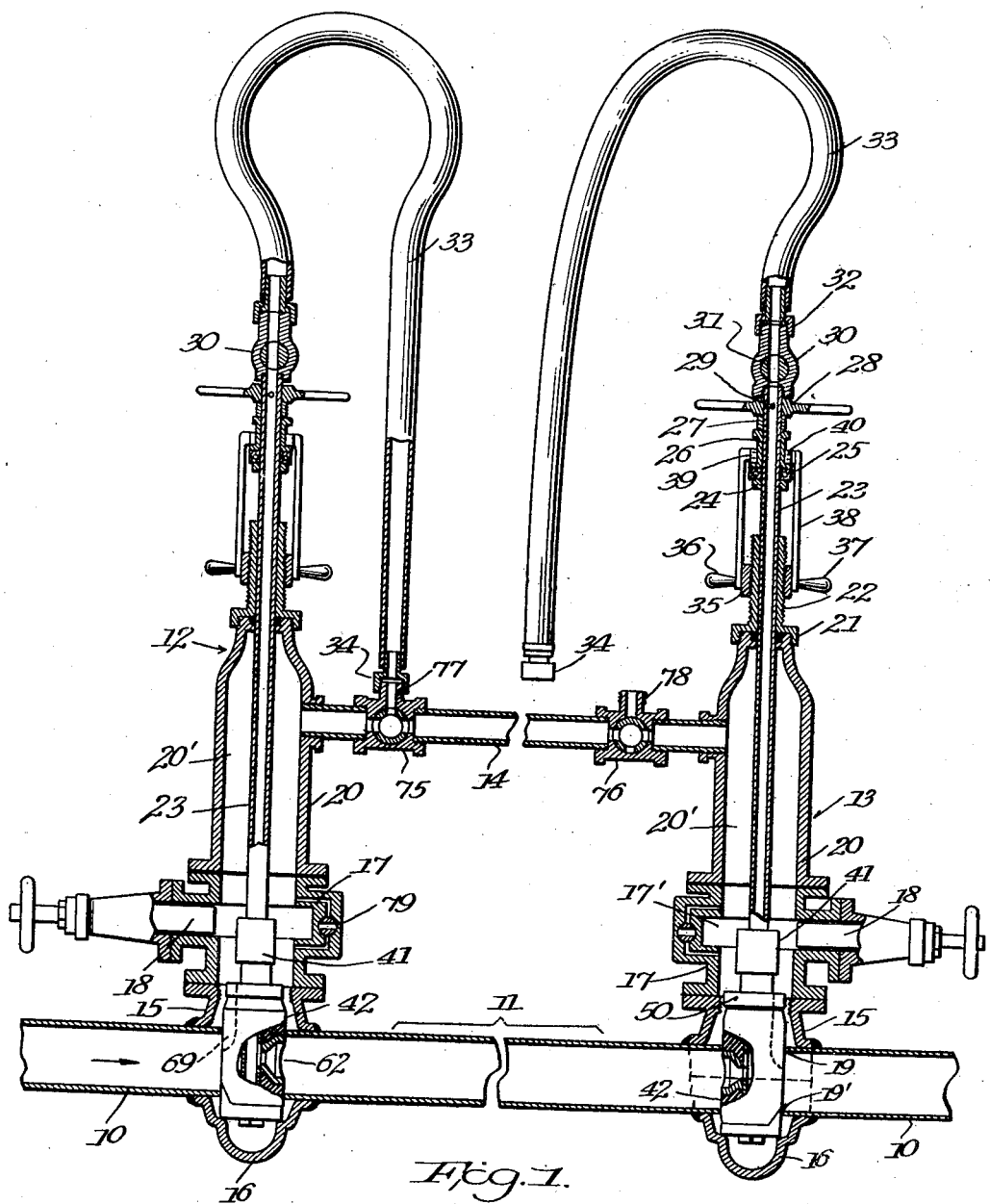
Figure 6:
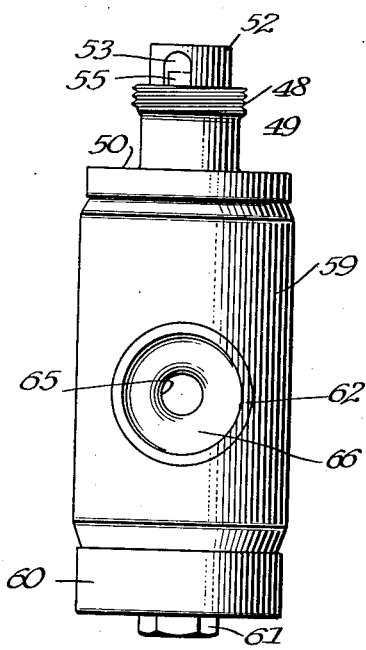
Figure 7:
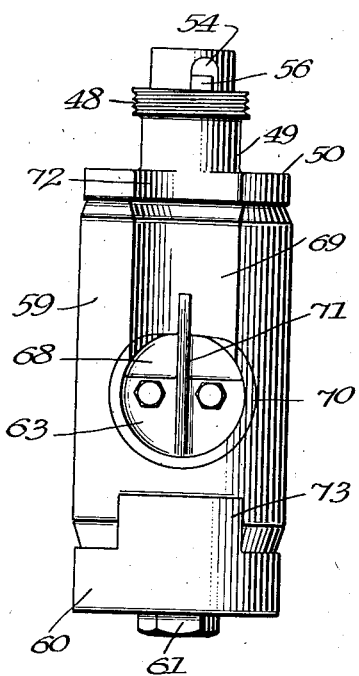
Figure 8:
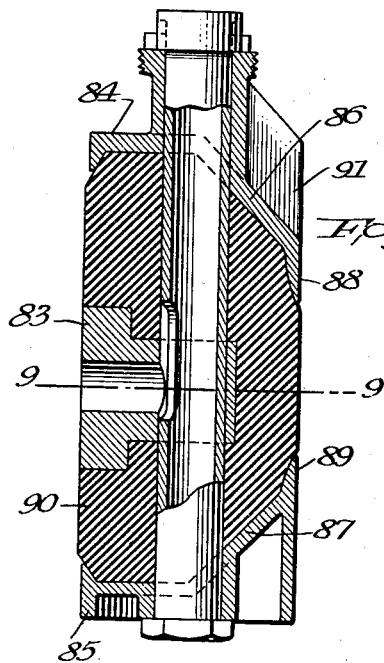
Figure 9:
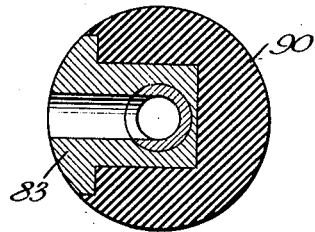

Suitable apparatus for accomplishing these various ends is shown by way of example in the accompanying drawings in which Figure 1 shows a typical set-up with some parts in section and others in elevation, Figure 2 is an enlargement of the showing at the lower right of Figure 1, Figure 3 is a section substantially on line 3—3 of Figure 2, Figure 4 is a plan view, enlarged, of a valve plug appearing in the preceding figures, Figure 5 shows on an enlarged scale, the valve stem coupling appearing in Figures 1 and 2, Figure 6 is an elevation of the plug of Figure 4, Figure 7 is an elevation of the same plug, but taken from the opposite side, Figure 8 is an axial section of another form of plug, and Figure 9 is a section substantially on line 9—9 of Figure 8.

In the set-up shown in Figure 1, it is contemplated that a gas main 10, with flow therein in the direction of the arrow, is to be repaired or replaced in the section indicated by the bracket 11, and that in any event the nature of the operation is such that flow through the section 11 must be interrupted, although flow must be maintained from one side of the section to the other. Under these circumstances, two units 12 and 13 are installed, one at each side of section 11 and connected by a by-pass conduit 14. The general system is fully described in my copending application Serial No. 100,780, filed September 14, 1936, and, accordingly, it will be unnecessary, in the present case, to go into great detail as to matters fully explained in the said application.

The units 12 and 13 may be, and, as here shown, are, of identical construction so that description of one will suffice. Particular reference will be had to unit 13, which, in part, appears in Figure 2 as well as in Figure 1.

As here contemplated, the conduit 10 has fixed thereto a fitting comprising upper and lower portions 15 and 16, which are secured to the main in coaxial relation, preferably by welding. A valve housing 17, carrying a gate valve 18 which may be projected across the chamber 17', is fixed to the top of fitting portion 15. In the manner described in my above-mentioned application, an enclosed drilling apparatus has been temporarily secured to the top of the housing 17 and holes 19 and 19' have been cut in the pipe. Upon removal of the drilling apparatus, a barrel 20 with chamber 20' is secured to the top of the housing 17, the barrel 20 being topped by a cap 21 having an upwardly projecting externally threaded tubular extension 22, through which extends a tubular valve stem portion 23, suitable packing being provided to prevent leakage around the said stem portion so that the housing unit constituted by the fitting 15, 16, the valve casing 17 and the barrel 20 is fluid-tight.

Adjacent its upper end the stem portion 23 has secured thereon, at least against relative downward movement, an abutment collar 24. The collar 24 supports a ball bearing assembly 25 which is in turn surmounted by a double flanged collar 26 which is rotatable relative to the stem portion. Above the collar 26 is a spacer collar 27 against the top of which bears the hub of a hand wheel 28 which is secured by a pin 29 against rotation relative to the stem. A valve housing 30 is threaded on the upper end of the stem portion and carries a rotary plug 31 which is adapted to open or close the valve passage. The upper end of the housing 30 is threaded to receive a hose coupling 32 to which is connected a hose length 33 having at its other end a coupling 34.

The stem portion 23 may be raised and lowered and turned by appropriate manipulation of the hand wheeel 28, but since for some operations considerable force is required to raise or lower it, suitable devices are provided for imparting powerful thrust to it through the flanged sleeve 26. For this purpose a nut 35 is threaded on the extension 22 and has pivoted thereto through the diametrically opposed handles 36 and 37 a yoke 38 whose cross portion is recessed and is swingable to the upwardly extending position shown in Figure 1 so that the recess receives the intermediate portion of the sleeve 26, the relation being such that upon upward or downward movement of the yoke induced by rotation of nut 35 the margins of the cross portion recess will engage the upper or lower flange of the sleeve 26 to raise or lower the stem portion. At the sides of the recess the cross portion of the yoke is provided with projecting lugs 39 and 40 which are pierced to receive a pin so that accidental swinging of the yoke away from sleeve 26 is prevented. Downward movement of the yoke is efficiently transmitted through the ball bearing assembly 25.

Referring to Figures 2 and 5 as well as to Figure 1, the lower end of the stem portion 23 is united by a coupling generally indicated at 41 with a valve plug generally indicated at 42. The lower reduced end of the stem portion is snugly received in the bore of a substantially cylindrical coupling member 43 and is securely welded to the latter. Member 43 has a socket portion 44 threaded with left hand threads and an enlarged coaxial socket portion threaded with right hand threads for the purposes described in my above-mentioned prior application. A cylindrical shell 46 freely receives member 43 and has a top inner annular flange 47 bearing against the top marginal portion of the said member. The skirt of shell 46 extends below the lower edge of member 43 when flange 47 abuts the top of the latter and its lower portion is provided with internal threads which are adapted to engage threads formed on the terminal flange 48 of the neck portion 49 of a cap 50 constituting a part of the plug 42. The plug 42 and its details are particularly shown in Figures 2 to 7 to which reference will now be made.

Extending downwardly through the neck 49 is a tubular stem portion 51 which has a head 52 normally resting on top of flange 48. The head 52 is of smaller diameter than the flange and in its lower portion has formed therein recesses 53 and 54 which receive the inner portions of upwardly projecting lugs 55 and 56 formed on top of flange 48, the lugs being positioned on the flange as particularly shown in Figure 4. Relative rotation of cap 50 and stem portion 51 is thus prevented, although relative sliding is permitted.

Coupling member 43 has notches 57 and 58 (Figure 5) in its lower edge adapted to receive the outer portions of lugs 55 and 56 and when the lugs are engaged in the notches, as shown most clearly in Figure 2, rotative movement of stem portion 23 may be positively imparted to cap 50 and stem portion 51 to adjust the plug 42.

Below cap 50 a generally cylindrical valve body 59 of compressible material such as rubber is strung on the stem portion 51 and retained by a lower cap 60 which is held on the lower end of stem portion 51 by a cap screw 61 threaded in the bottom of the latter.

Medially the body 59 is provided with a transverse through opening complementary to a pair of fittings 62 and 63. Fitting 62 has a vertical bore 64 slidably receiving stem portion 51 and is provided with a communicating counterbore 65 merging outwardly into a mouth 66. Stem portion 51 is provided with an elongated opening 67 which is in at least partial register with opening 65 at all times, the normal relation of the openings being shown in Figure 2.

Fitting 63 is secured by screws to the fitting 62. It has an upper wall portion 68 inclined inwardly to merge into the bottom of a recess 69, of arcuate cross section, formed in the body 59 thereabove. Fitting 63 also has an outwardly projecting peripheral flange 70 interrupted at the bottom of the recess 69 to provide a continuation of the latter, and further has a fin 71 in the plane of the plug axis providing an outer vertical guiding edge. Both fittings are within the projection of the body 59.

The cap 50 has a recess 72 above recess 69 providing a continuation of the latter. Furthermore, as here shown the cap has a lower peripheral flange inwardly bevelled to receive the bevelled end of the body 59. The cap 60 similarly receives the lower end of body 59 and below fitting 63 has an elongated flange portion 73.

Figure 5 shows the stem portion 23 as about to be coupled with the stem portion 51 and flange 48 of neck 49. Figure 2 shows the coupling as having been completed through engagement of shell 46 with flange 48. Member 43 bears against the top of flange 48 and is locked to the latter and to stem portion 51 through the lugs 55 and 56. In order to insure a fluid-tight joint between the stem portions, a compressible gasket 74 may be interposed between the top of head 52 and the shoulder which exists at the lower end of socket portion 44.

Referring particularly to Figure 2, the plug 42 is shown as having been lowered through the openings 19 and 19' to bring cap 60 into abutment with the shoulder 16' of the fitting portion 16. The fitting 62 is faced into the section 11 which is to be repaired or replaced or otherwise operated on and fitting 63 is faced into the down stream side of the main 10. The upper edge of flange 73 projects into the opening 19' and, as here shown, somewhat thereabove, while the fin 71 extends substantially above the opening 19. If downward pressure is now exerted on stem portion 23 through operation of the pressure applying mechanism 35, 38, cap 50 and stem portion 51 will be moved downwardly relative to cap 60 so that longitudinal compression is exerted on body 59 and the latter is expanded to be seated transversely of the main and to the left against the adjacent edges of the openings 19 and 19' whereby the main is plugged and the section to be repaired is shut off from the downstream side of the main. However, flow can occur between the latter and the unit casing and flow may occur between section 11 and the hollow valve stem as controlled by the valve plug 31. In compressing the valve body stem portion 51 has been moved downwardly somewhat relative to fittings 62 and 63 and cap 60 but capacity flow through openings 65 is still possible due to the elongation of opening 67. The body 59 is compressed both above and below fittings 62 and 63 so that the latter will themselves have been moved downwardly to some extent, but the upper end of fin 71 is still in front of the edge of opening 19 and prevents undue displacement of the plug to the right.

No seal is desired at the right hand side of the plug (Figure 2) and consequently flow of the rubber longitudinally of the main should be predominantly to the left where the seal is to be made. Fitting 63 serves to impede flow of the rubber in its direction and enables higher pressures to be stopped off than with a solid rubber plug. The end flange 73 prevents the rubber on the right hand side of the plug from engaging the sharp edges of the opening 19' and thus the life of the plug body is increased. Furthermore, flange 73 serves to restrain flow of the rubber and exerts a wedging action so that flow in the lower portion of the plug and longitudinally of the main is predominantly to the left. Also with the use of the fitting 63 the rubber is of smaller volume and therefore more economical to replace and the support which the fitting provides permits a much larger by-pass area 69 than in the solid type of plug.

The unit 12 (Figure 1) is oppositely disposed in the main as compared to the unit 13 so that the section 11 is in communication through the fittings 62 with both of the valve stem passages while the chamber of unit 12 is in communication with the upstream side of the line through recess 68. The barrels of the two units are connected by the by-pass conduit 14 and three-way valves 75 and 76 are interposed in the conduit 14 adjacent their respective barrels. Valve 75 has a nipple 77 engageable by the hose coupling 34 for connection with the hollow stem of unit 12 while valve 76 has a similar nipple 78 for engagement by the coupling 34 of the other hose section so as to be connectible with the hollow valve stem of the other unit 13.

After the line has been pierced within the fittings 15, 16 the gate valves 18 are closed so that the drill housing can be removed and replaced by the barrels 20 in which the plugs are disposed. Flow at this time is through section 11. The system as set up is full of air and to avoid dilution of the fluid in the main a desirable preliminary step is the purging of the air from the system.

To accomplish this, valves 75 and 76 in the by-pass conduit are each turned 180° from the position illustrated so that flow through the nipple 77 is prevented and flow through the nipple 78 is permitted. Hereupon, valves 30 being closed, the gate valve of unit 12 is somewhat opened so that gas can flow through the associated chamber 20' and the conduit 14 up to and out of the nipple 78, driving the air before it. In order that any escaping gas may be carried away to a safe place, the hose 33 of unit 13 may be coupled with the nipple 78 and uncoupled from the valve 30. To purge the unit 13, valve 75 may be now turned in a counterclockwise direction 90° from the position shown and the gate valve 18 of the unit 13 slightly opened to permit flow from the main through chamber 20' and out through nipple 78. Since the gate valve is seated upwardly with considerable force by reason of the pressure in the main, the last described purging operation may be more conveniently carried out by turning the by-pass valve 79 (Figure 2) to the position shown so that fluid from the main can flow through the opening 80 in the bottom wall of the hollow gate valve 18, out of the open inner end of the gate valve, and through the by-pass conduit 81 to the chamber 20'.

Or, more simply still, entire purging of the system can be effected by turning the valves 75 and 76 to the positions first described above and turning the plug 79 90° in a counterclockwise direction from the position shown in Figure 2 so that the upper part of the by-pass 81 is connected with the outlet 82. This latter practice, however, is somewhat objectionable in that there will be some escape of gas through outlet 82 in the vicinity of the workmen as the gas follows the air out at the conclusion of the purging operation.

The by-pass conduit may now be placed in operation to the exclusion of section 11 by opening both valves 18 and pushing the plugs 42 to their lowermost positions and expanding them as above described. Valve 76 is in the position shown in Figure 1, and the valve 75 has been turned 180° from the position shown in Figure 1 so that the flow takes place upwardly through the chamber of unit 12, across conduit 14 and downwardly through the chamber of unit 13 to the downstream side of the main 10.

Section 11 may now be cut into without loss of fluid from the main. The section 11, however, is assumed to be full of gas, although dead, and the escape of gas from the same upon cutting into it, especially with an acetylene torch, is apt to produce a dangerous situation. Consequently it is desirable that the gas be driven from section 11 before operations are commenced thereon. To accomplish this it is merely necessary that both couplings 34 be disengaged and valves 30 opened, permitting the gas to rise through the hollow stems and to be led away through the hoses. To complete the evacuation of section 11, air may be blown through one hose to displace the gas through the other. Section 11 may now be operated on without danger of resultant explosion.

When the operations on section 11 have been completed it remains filled with air which upon restoration of the section to flow would dilute the gas in the main. Consequently it is desirable to purge the air from the said section prior to its restoration to service. With the parts adjusted as shown in Figure 1, to accomplish this, it is only necessary to open both valves 30 so that gas flows downwardly through the hollow stem of unit 12 displacing the air from section 11 upwardly through the hollow stem of unit 13 and out through the associated hose 33. The end of the latter may be placed in a bucket of soap suds and a test can be made to determine when section 11 has been completely purged of air.

When this has been accomplished, the valve 30 of unit 13 is closed, causing pressure to build up in section 11 until it is equal to the pressure in the line. When the pressure has thus been equalized, it is only necessary to raise the plugs above the gate valves, close the latter and then plug the upper fitting portions 15 in the manner described in my above-mentioned prior application.

In the modified form of plug shown in Figures 8 and 9, the fitting 83 corresponds in function and disposition with the fitting 62 previously described. The caps 84 and 85 on their sides opposite fitting 83 are outwardly inclined toward each other, as at 86 and 87, and terminate in lips 88, 89, the caps being substantially circular in projection. It will be evident that upon movement of cap 84 toward cap 85 the wedging effect of the right hand portions of the caps will cause predominant expansion of the compressible plug body 90 to the left. A by-pass recess exists above portion 86 or cap 84 and a fin 91 rises from the latter and has the same function as the fin 71 previously described.

While I have described specific apparatus and various uses thereof, it will be understood that the apparatus may be varied from that disclosed herein in details of form and arrangement, and that uses of the apparatus and method are not confined to those described. The invention is not to be considered as limited beyond what is explicity set forth in the following claims.

This application is a division of my co-pending application Serial No. 156,795, filed July 31, 1937 for Pressure control fitting.

I claim:

1. Apparatus of the class described comprising a valve fitting with opposed ports of which one is surrounded by a seat, a valve body introducible into said fitting to engage said seat, a hollow stem in connection with said body, said body having an opening connecting said one of said ports with the stem passage when the valve body is seated, a valve for controlling said stem passage, means defining a chamber in connection with said fitting, said body being recessed to provide a passage between the other of said ports and said chamber when said valve body is seated, and a valved outlet for said chamber.

2. Apparatus of the class described comprising a valve fitting with opposed ports of which one is surrounded by a seat, a valve body introducible into said fitting to engage said seat, a hollow stem in connection with said body, said body having an opening connecting said one of said ports with the stem passage when the valve body is seated, a valve for controlling said stem passage, means defining a chamber in connection with said fitting, said body being recessed to provide a passage between the other of said ports and said chamber when said valve body is seated, and means for establishing a connection between the stem passage and said chamber when said valve body is seated.

3. Apparatus of the class described comprising a valve fitting with opposed ports of which one is surrounded by a seat, a plug comprising a compressible valve body and a hollow stem extending through said body, said plug being introducible into said fitting and said body then expansible into engagement with said seat, said body having an opening connecting said one of said ports with the stem passage when the valve body is seated, a valve for controlling said stem passage, means defining a chamber in connection with said fitting, said plug being recessed to provide a passage between the other of said ports and said chamber when said valve body is seated, and a valved outlet for said chamber.

4. Apparatus of the class described comprising a valve fitting with opposed ports of which both are surrounded by rims, a plug comprising a compressible valve body and a stem extending through said body, said plug being introducible into said fitting and said body being then expansible into seating engagement with one of said rims, said plug also including protective metal portions for said body engageable with the other of said rims when said body is expanded, at least one of said portions being formed with a wedge surface to enforce expansion of said body toward said one of said rims.

5. A valve plug comprising a compressible body and an end cap therefor, said cap being shaped to cause predominant lateral expansion of said body in one direction upon the application of longitudinally directed pressure to said body.

6. A valve plug comprising a body of compressible material, a hollow stem extending through said body and provided with a lateral opening within the body, and a fitting in the medial portion of the body and having a portion exposed at one side of the body, said fitting having a bore receiving said stem and a passage extending from the stem opening through the exposed portion of the fitting.

7. A valve plug comprising a body of compressible material, a hollow stem extending through said body and provided with a lateral opening within the body, and a fitting in the medial portion of the body and having a portion exposed at one side of the body, said fitting having a bore receiving said stem and a passage extending from the stem opening through the exposed portion of the fitting, said plug being provided on its side opposite said exposed portion with a recess extending longitudinally of the stem and confined to one end of the plug.

8. A valve plug according to claim 6 wherein the fitting is slidable on the stem.

9. A valve plug according to claim 6 wherein the fitting is slidable on the stem, and wherein the stem opening is elongated in the axial direction of the stem.

10. A valve plug comprising a body of compressible material, a hollow stem extending through said body and provided with a lateral opening within the body, a fitting in the medial portion of the body and having a portion exposed at one side of the body, said fitting having a bore receiving said stem and a passage extending from the stem opening through the exposed portion of the fitting, and a second fitting secured to the first and including a rib having a laterally exposed edge extending substantially parallel to the stem.

11. A valve plug comprising a body of compressible material and a stem portion extending through said body, caps on said stem, one at each end of said body, said stem being slidable relative to one of said caps, a second stem portion, and coupling means securing said stem portions and the other of said caps against relative rotation and axial displacement, said other of said caps securing said body against rotation relative thereto.

FRANK H. MUELLER.